(12) United States Patent
Ozawa

(10) Patent No.: US 10,609,231 B2
(45) Date of Patent: Mar. 31, 2020

(54) IMAGE PROCESSING APPARATUS ACQUIRING BIOLOGICAL INFORMATION AND ASSOCIATING SAME WITH OPERATING STATE

(71) Applicant: Konica Minolta, Inc., Tokyo (JP)

(72) Inventor: Kaitaku Ozawa, Nishinomiya (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/435,925

(22) Filed: Jun. 10, 2019

(65) Prior Publication Data

US 2019/0297204 A1 Sep. 26, 2019

Related U.S. Application Data

(63) Continuation of application No. 15/434,616, filed on Feb. 16, 2017, now abandoned.

(30) Foreign Application Priority Data

Mar. 18, 2016 (JP) .................................. 2016-056123

(51) Int. Cl.
*G06F 3/12* (2006.01)
*H04N 1/00* (2006.01)
(Continued)

(52) U.S. Cl.
CPC ..... *H04N 1/00477* (2013.01); *G06K 9/00892* (2013.01); *H04N 1/0035* (2013.01); *H04N 1/00244* (2013.01); *H04N 1/00411* (2013.01); *H04N 1/00413* (2013.01); *H04N 1/00854* (2013.01); *H04N 1/442* (2013.01); *G06F 1/163* (2013.01); *H04N 2201/0039* (2013.01); *H04N 2201/0055* (2013.01); *H04N 2201/0094* (2013.01); *H04N 2201/3202* (2013.01);
(Continued)

(58) Field of Classification Search
None
See application file for complete search history.

(56) References Cited

U.S. PATENT DOCUMENTS

| 2012/0049998 A1* | 3/2012 | Lim | H04M 1/72569 340/1.1 |
| 2015/0199010 A1* | 7/2015 | Coleman | A61B 5/0006 345/156 |
| 2017/0269886 A1* | 9/2017 | Ozawa | G06F 3/1203 |

FOREIGN PATENT DOCUMENTS

| JP | 2007087119 A | 4/2007 |
| JP | 2008058039 A | 3/2008 |
| JP | 2012249797 A | 12/2012 |

OTHER PUBLICATIONS

JPO, Notice of Reasons for Refusal for the corresponding Japanese patent application No. 2016-056123, dated Sep. 5, 2019, with English translation (15 pages).
(Continued)

*Primary Examiner* — Dov Popovici
(74) *Attorney, Agent, or Firm* — Lucas & Mercanti, LLP

(57) ABSTRACT

An image processing apparatus includes: a display unit configured to display an operation screen; an acquisition unit configured to acquire biological information of a user performing operation using the operation screen, the biological information varying reflecting a state of the user; and a registration control unit configured to control operation of registering information on the operation screen and the biological information of the user in association with each other.

21 Claims, 16 Drawing Sheets

<OPERATION SCREEN HISTORY INFORMATION>

| No. | USER INFORMATION | SCREEN INFORMATION | TIME | BIOLOGICAL (BLOOD PRESSURE) INFORMATION |
|---|---|---|---|---|
| 1 | USER U1 | SCREEN C1 | 2015/11/15 12:00 | 120 |
| 2 | USER U1 | SCREEN C2 | 2015/11/15 12:02 | 200 |
| 3 | USER U1 | SCREEN C3 | 2015/11/15 12:03 | 130 |
| 4 | : | : | : | : |

(51) Int. Cl.
*H04N 1/44* (2006.01)
*G06K 9/00* (2006.01)
G06K 15/00 (2006.01)
G06F 1/16 (2006.01)

(52) U.S. Cl.
CPC .................. *H04N 2201/328* (2013.01); *H04N 2201/3273* (2013.01)

(56) References Cited

OTHER PUBLICATIONS

JPO, Office Action for the corresponding Japanese patent application No. 2016-056123, dated 2019, with English translation (9 pages) Dec. 12, 2019.

\* cited by examiner

FIG. 6

<OPERATION SCREEN HISTORY INFORMATION>

| No. | USER INFORMATION | SCREEN INFORMATION | TIME | BIOLOGICAL (BLOOD PRESSURE) INFORMATION |
|---|---|---|---|---|
| 1 | USER U1 | SCREEN C1 | 2015/11/15 12:00 | 120 |
| 2 | USER U1 | SCREEN C2 | 2015/11/15 12:02 | 200 |
| 3 | USER U1 | SCREEN C3 | 2015/11/15 12:03 | 130 |
| 4 | : | : | : | : |

<OPERATION SCREEN HISTORY INFORMATION>

| No. | USER INFORMATION | SCREEN INFORMATION | OPERATION INFORMATION | TIME | BIOLOGICAL (BLOOD PRESSURE) INFORMATION |
|---|---|---|---|---|---|
| 1 | USER U1 | SCREEN C1 | BUTTON B1 PRESSED | 2015/11/15 12:00 | 120 |
| 2 | USER U1 | SCREEN C2 | BUTTON B21 PRESSED | 2015/11/15 12:01 | 160 |
| 3 | USER U1 | SCREEN C2 | BUTTON B22 PRESSED | 2015/11/15 12:02 | 200 |
| 4 | USER U1 | SCREEN C3 | BUTTON B3 PRESSED | 2015/11/15 12:03 | 130 |
| 5 | ... | ... | ... | ... | ... |

FIG. 11

<OPERATION SCREEN HISTORY INFORMATION>

| No. | USER INFORMATION | SCREEN INFORMATION | OPERATION INFORMATION | TIME | BIOLOGICAL (BLOOD PRESSURE) INFORMATION |
|---|---|---|---|---|---|
| 1 | USER U1 | SCREEN C1 | BUTTON B1 PRESSED | 2015/11/15 12:00 | 120 |
| 3 | USER U1 | SCREEN C2 | BUTTON B22 PRESSED | 2015/11/15 12:02 | 200 |
| 4 | USER U1 | SCREEN C3 | BUTTON B3 PRESSED | 2015/11/15 12:03 | 130 |
| 5 | : | : | : | : | : |

<OPERATION SCREEN HISTORY INFORMATION>

| No. | USER INFORMATION | SCREEN INFORMATION | TIME | BIOLOGICAL (BLOOD PRESSURE) INFORMATION |
|---|---|---|---|---|
| 1 | USER U1 | SCREEN C1 | 2015/11/15 12:00 | 120 |
| 2 | USER U1 | SCREEN C2 | 2015/11/15 12:01 | 160 |
| 3 | USER U1 | SCREEN C2 | 2015/11/15 12:02 | 200 |
| 4 | USER U1 | SCREEN C3 | 2015/11/15 12:03 | 130 |
| 5 | : | : | : | : |

IMAGE PROCESSING APPARATUS ACQUIRING BIOLOGICAL INFORMATION AND ASSOCIATING SAME WITH OPERATING STATE

This is a continuation application of U.S. patent application Ser. No. 15/434,616 filed on Feb. 16, 2017, which claimed the priority of Japanese Patent Application No. 2016-056123 filed on Mar. 18, 2016, the priority of both applications is claimed and both applications are incorporated herein by reference in their entirely.

BACKGROUND OF THE INVENTION

Field of the Invention

An embodiment of the present invention relates to an image processing apparatus such as a multi-functional peripheral (MFP), and technologies related thereto.

Description of the Related Art

Terminal devices (hereinafter also referred to as wearable terminals, wearable devices, or the like) capable of being worn by users have been increasingly used in recent years. In addition, the wearable terminals include devices (also referred to as biological information detection devices) configured to detect body information (such as pulse wave) of a user.

There is also a technology for simplifying a login operation by using biological information (specifically, a fingerprint, an iris, a vein, or the like) for identifying a person in an image processing apparatus such as an MFP (refer to JP 2008-33391 A).

In an image processing apparatus such as an MFP, operation with various operation screens is performed. There have been demands for improvement in user-friendliness of such operation screens as needed.

It is, however, not easy to collect information leading to improvement of various operation screens. Note that the technology disclosed in JP 2008-33391 A is a technology for identifying a person by using biological information (specifically, a fingerprint, an iris, a vein, or the like) to simplify the login operation of an MFP, but is not a technology for collecting information leading to improvement of operation screens.

SUMMARY OF THE INVENTION

An object of the present invention is therefore to provide a technology capable of easily collecting information leading to improvement of operation screens.

To achieve the abovementioned object, according to an aspect, an image processing apparatus reflecting one aspect of the present invention comprises: a display unit configured to display an operation screen; an acquisition unit configured to acquire biological information of a user performing operation using the operation screen, the biological information varying reflecting a state of the user; and a registration control unit configured to control operation of registering information on the operation screen and the biological information of the user in association with each other.

According to an invention of Item. 2, in the image processing apparatus of Item. 1, the biological information is preferably information that changes reflecting a mental condition and/or a physical condition of the user.

According to an invention of Item. 3, in the image processing apparatus of Item. 1 or 2, the biological information preferably includes information relating to at least one of pulse wave, electrocardiogram, body temperature, heart rate, and blood pressure.

According to an invention of Item. 4, in the image processing apparatus of any one of Items. 1 to 3, the information on the operation screen preferably contains screen identification information of the operation screen, and the registration control unit preferably registers the screen identification information and the biological information of the user in association with each other.

According to an invention of Item. 5, in the image processing apparatus of any one of Items. 1 to 3, the information on the operation screen preferably contains screen identification information of the operation screen and operation information indicating a content of operation on the operation screen, and the registration control unit preferably registers the screen identification information, the operation information, and the biological information of the user in association with one another.

According to an invention of Item. 6, in the image processing apparatus of any one of Items. 1 to 5, the acquisition unit preferably acquires biological information items each measured at a specific timing of each operation screen, and the registration control unit preferably registers each of the biological information items in association with information on the corresponding operation screen.

According to an invention of Item. 7, in the image processing apparatus of Item. 6, the specific timing of each operation screen is preferably a time point immediately after screen transition from the operation screen.

According to an invention of Item. 8, in the image processing apparatus of any one of Items. 1 to 5, the information on the operation screen preferably contains screen identification information of the operation screen and a plurality of operation information items each indicating a content of one of a plurality of operations on the operation screen, the acquisition unit preferably acquires a plurality of biological information items each measured at one of time points associated with the contents of operations, and the registration control unit preferably registers the screen identification information, a corresponding one of the operation information items, and a corresponding one of the biological information items in association with one another.

According to an invention of Item. 9, in the image processing apparatus of any one of Items. 1 to 5, the acquisition unit preferably acquires a plurality of biological information items measured at a plurality of time points within a period corresponding to a period during which the operation screen is displayed, and the registration control unit preferably registers the biological information items in association with the information on the operation screen.

According to an invention of Item. 10, in the image processing apparatus of any one of Items. 1 to 5, the acquisition unit preferably acquires at least one of biological information items measured within a period corresponding to a period during which the operation screen is displayed, and the registration control unit preferably registers only biological information items resulting from changes by a predetermined level or larger from a most recently registered biological information item, among the at least one biological information items, in association with the information on the operation screen.

According to an invention of Item. 11, in the image processing apparatus of Item. 9, the biological information items are preferably measured the plurality of time points being at predetermined time intervals.

According to an invention of Item. 12, in the image processing apparatus of any one of Items. 1 to 11, the acquisition unit preferably acquires the biological information measured by a wearable device worn by the user from the wearable device through communication with the wearable device.

According to an invention of Item. 13, in the image processing apparatus of any one of Items. 1 to 11, the acquisition unit preferably acquires the biological information measured by a wearable device worn by the user, thereafter transferred to a server and stored in the server from the server through communication with the server.

According to an invention of Item. 14, in the image processing apparatus of any one of Items. 1 to 13, the registration control unit preferably transmits operation screen history information containing the information on the operation screen and the biological information of the user in association with each other to a server for storage of the operation screen history information.

According to an invention of Item. 15, in the image processing apparatus of any one of Items. 1 to 14, the image processing apparatus preferably further comprises: a determination unit configured to determine the operation screen to be an improvement needed screen when the state of the user within a period during which the operation screen is displayed is determined not to be in a normal condition on a basis of the biological information of the user.

According to an invention of Item. 16, in the image processing apparatus of Item. 5 or 8, the image processing apparatus preferably further comprises: a determination unit configured to determine the operation screen to be an improvement needed screen when the state of the user within a period during which the operation screen is displayed is determined not to be in a normal condition on a basis of the biological information of the user, and determine an operation button operated on the improvement needed screen to be an improvement needed button; and an output control unit configured to output a guidance relating to the improvement needed button when the operation screen determined to be the improvement needed screen is called again in response to a user operation and displayed as a new operation screen.

According to an invention of Item. 17, in the image processing apparatus of Item. 5 or 8, the image processing apparatus preferably further comprises: a determination unit configured to determine the operation screen to be an improvement needed screen when the state of the user within a period during which the operation screen is displayed is determined not to be in a normal condition on a basis of the biological information of the user, and determine an operation button operated on the improvement needed screen to be an improvement needed button; and a display control unit configured to display a menu screen, wherein after the presence of the improvement needed button is determined, the display control unit adds a call button for calling an operation screen relating to the improvement needed button or the improvement needed button itself onto the menu screen.

To achieve the abovementioned object, according to an aspect, a non-transitory recording medium storing a computer readable program reflecting one aspect of the present invention causes a computer included in an image processing apparatus to execute: a) a step of acquiring biological information of a user performing operation using an operation screen of the image processing apparatus, the biological information varying reflecting a state of the user; and b) a step of performing operation of registering information on the operation screen and the biological information of the user in association with each other.

To achieve the abovementioned object, according to an aspect, an image processing system reflecting one aspect of the present invention comprises: an image processing apparatus; and a server, wherein the image processing apparatus includes: a display unit configured to display an operation screen; an acquisition unit configured to acquire biological information of a user performing operation using the operation screen, the biological information varying reflecting a state of the user; and a transmission unit configured to transmit operation screen history information containing information on the operation screen and the biological information of the user in association with each other to the server, and the server includes: a receiving unit configured to receive the operation screen history information from the image processing apparatus; and a storage unit configured to store the operation screen history information.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 6 is a table showing operation screen history information containing an operation screen and biological information in association with each other and being registered;

FIG. 8 is a diagram illustrating a copy menu screen;

FIG. 10 is a table showing operation screen history information in which operation information is also associated;

FIG. 11 is a table showing operation screen history information in which only some of a plurality of biological information items are registered;

FIG. 12 is a table showing operation screen history information containing a plurality of biological information items acquired at predetermined time intervals each in association with an operation screen;

FIG. 14 is a diagram illustrating an example of display of guidance relating to an improvement needed button;

DESCRIPTION OF THE PREFERRED EMBODIMENTS

Hereinafter, an embodiment of the present invention will be described with reference to the drawings. However, the scope of the invention is not limited to the illustrated examples.

1. First Embodiment

1-1. Configuration Outline

Figure 1:
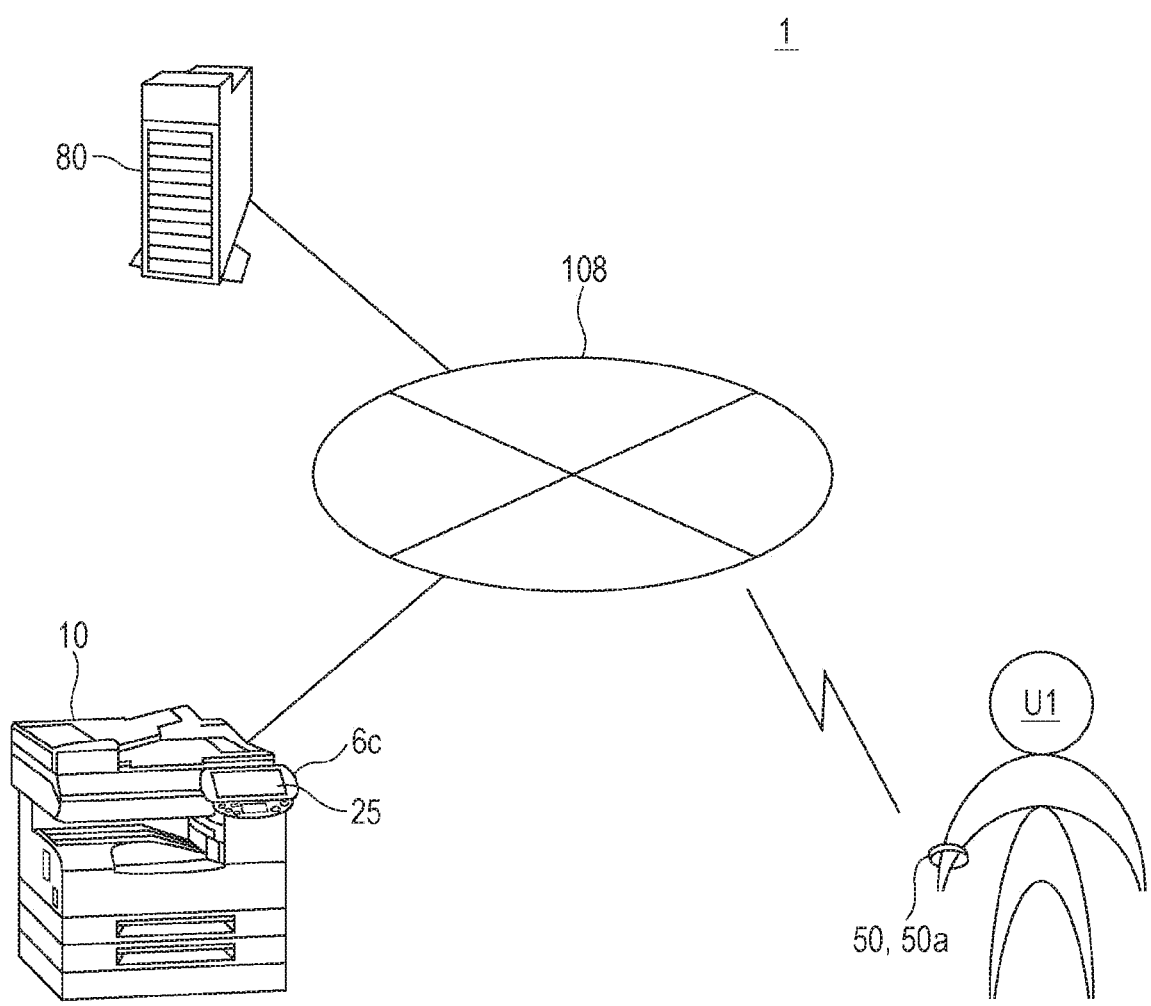
FIG. 1 is a diagram illustrating an image processing system according to an embodiment of the present invention.

FIG. 1 is a diagram illustrating an image processing system 1 according to a first embodiment of the present invention. As illustrated in FIG. 1, the image processing system 1 includes an MFP (image processing apparatus) 10, a wearable terminal 50, and a server computer 80.

The respective components 10, 50, and 80 of the system 1 are connected to one another via a network 108 so as to be able to communicate with one another. The network 108 includes a local area network (LAN), the Internet, or the like. The connection to the network 108 may be wired connection or wireless connection.

The MFP 10 and the wearable terminal 50 are connected with each other through wireless connection using various radio communication technologies. For example, communication using a wireless LAN (IEEE 802.11, and the like) and short-range radio communication can be used for the communication between the MFP 10 and the wearable terminal 50. Examples of the short-range radio communication include communication based on Bluetooth (registered trademark) low energy (BLE) and Near field radio communication (NFC).

1-2. Configuration of Image Processing Apparatus

Figure 2:
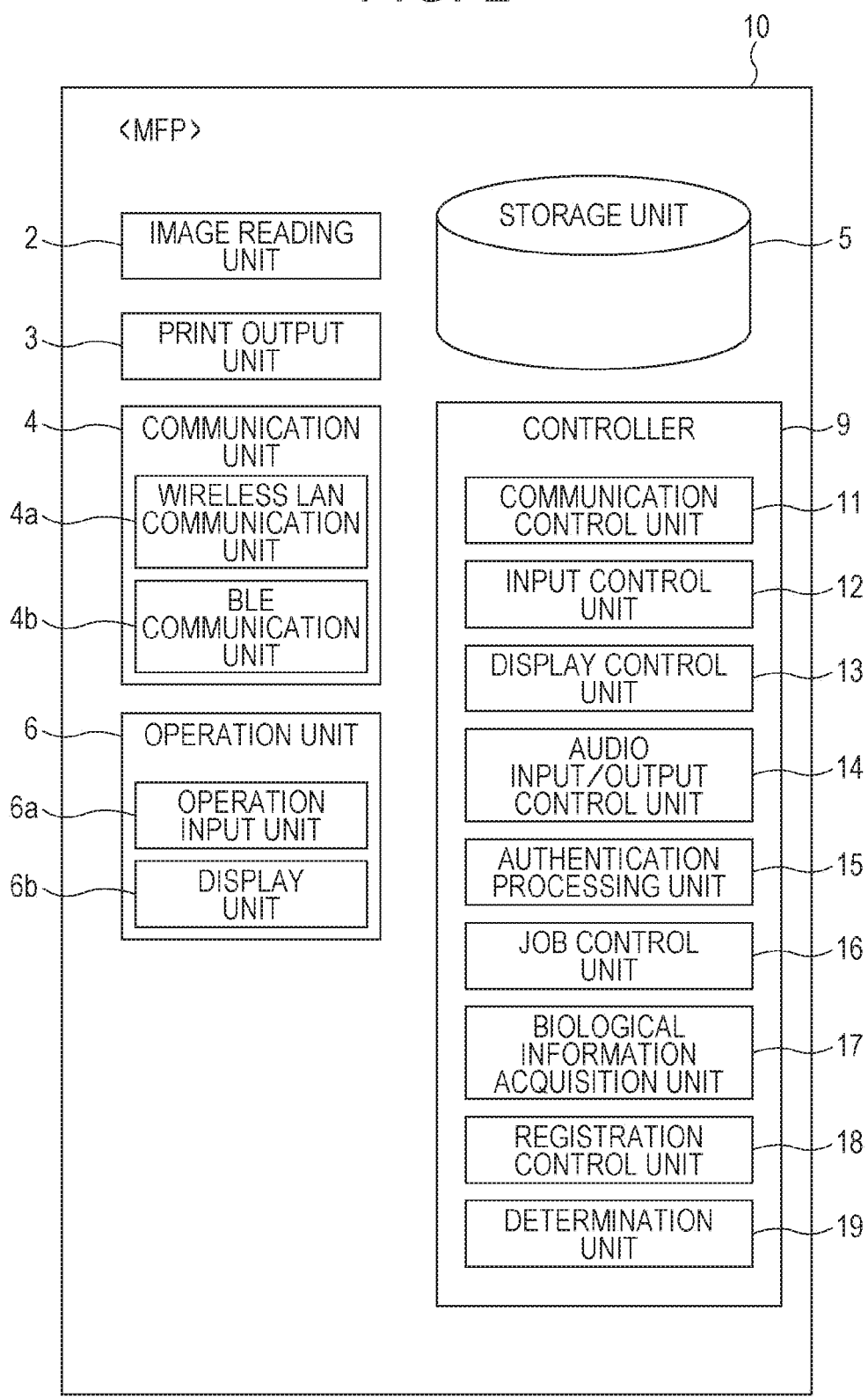
FIG. 2 is a diagram illustrating functional blocks of an MFP (image processing apparatus)

FIG. 2 is a diagram illustrating functional blocks of the image processing apparatus 10. Herein, a multi-functional peripheral (MFP) is described as an example of the image processing apparatus 10. In FIG. 2, functional blocks of the MFP 10 are illustrated.

The MFP 10 is an apparatus (also referred to as a multifunction machine) including a scanning function, a copy function, a facsimile function, a box storage function, and the like. More specifically, as illustrated in the functional block diagram of FIG. 2, the MFP 10 includes an image reading unit 2, a print output unit 3, a communication unit 4, a storage unit 5, an operation unit 6, a controller 9, and the like and implements various functions by operating these respective units in combination. Note that the MFP 10 is also referred to as an image forming apparatus.

The image reading unit 2 is a processing unit configured to optically read (that is, scan) an original document placed at a predetermined position (on an automatic document feeder (ADF), a glass surface, or the like) of the MFP 10 and generate image data (also referred to as a document image or a scanned image) of the document. The image reading unit 2 is also referred to as a scanning unit.

The print output unit 3 is an output unit configured to print out an image on various media such as paper on the basis of data on an original to be printed.

The communication unit 4 is a processing unit capable of performing facsimile communication through a public line or the like. The communication unit 4 is also capable of performing various types of radio communication. Specifically, the communication unit 4 includes a wireless LAN communication unit 4a configured to perform radio communication using a wireless LAN (IEEE 802.11, and the like) and a BLE communication unit 4b configured to perform radio communication using the BLE.

The storage unit 5 includes a storage device such as a hard disk drive (HDD).

The operation unit 6 includes an operation input unit 6a configured to receive an operational input to the MFP 10, and a display unit 6b configured to output display of various information items.

The MFP 10 is provided with a substantially tabular operation panel unit 6c (see FIG. 1). In addition, the operation panel unit 6c has a touch panel 25 on a front side thereof (see FIG. 1). The touch panel 25 functions as part of the operation input unit 6a and also as part of the display unit 6b. The touch panel 25 includes a liquid crystal display panel and various sensors and the like embedded in the liquid crystal display panel, and is capable of displaying various information items and receiving various operational inputs provided by an operator.

The controller 9 is a control device included in the MFP 10 and configured to generally control the MFP 10. The controller 9 is a computer system including a CPU, various semiconductor memories (a RAM and a ROM), and the like. The controller 9 implements various processing units by the CPU executing predetermined software programs (hereinafter also simply referred to as programs) stored in the ROM (an EEPROM, for example). Note that the programs (more specifically, a group of program modules) may be recorded in a portable recording medium such as a USB memory, and read from the recording medium so as to be installed in the MFP 10. Alternatively, the programs may be downloaded via a network and installed in the MFP 10.

Specifically, as illustrated in FIG. 2, the controller 9 implements various processing units including the communication control unit 11, the input control unit 12, the display control unit 13, the audio input/output control unit 14, the authentication processing unit 15, the job control unit 16, the biological information acquisition unit 17, the registration control unit 18, and the determination unit 19 by executing the programs.

The communication control unit 11 is a processing unit configured to control operation for communication with other devices (such as the wearable terminal 50) in cooperation with the communication unit 4 and the like. The communication control unit 11 includes a transmission control unit configured to control operation of transmitting various data, and a reception control unit configured to control operation of receiving various data.

The input control unit 12 is a control unit configured to control operation of operational input to the operation input unit 6a (such as the touch panel 25). For example, the input control unit 12 controls operation of receiving an operational input (such as a designation input from a user) on an operation screen displayed on the touch panel 25.

The display control unit 13 is a processing unit configured to control display operation on the display unit 6b (such as the touch panel 25). The display control unit 13 displays an operation screen or the like for operating the MFP 10 on the touch panel 25.

The audio input/output control unit 14 is a processing unit configured to control an audio inputting process performed by an audio input unit (such as a microphone (not illustrated) included in the image processing apparatus 10), an audio output process performed by an audio output unit (such as a speaker (not illustrated) included in the image processing apparatus 10), and the like.

The authentication processing unit 15 is a processing unit configured to control a user authentication process (a login process).

The job control unit 16 is a processing unit configured to control operation relating to various jobs (such as print output operation and image reading operation).

The biological information acquisition unit 17 is a processing unit configured to acquire biological information of a user operating the MFP 10 by using the operation screen displayed on the touch panel 25 (and wearing the wearable terminal 50), in cooperation with the wearable terminal 50. The biological information will be described below.

The registration control unit 18 is a processing unit configured to control operation (registration operation) of registering information on an operation screen of the MFP 10 (specifically, identification information of the operation screen (a screen ID, and the like)) and biological information of the user performing operation using the operation screen in association with each other. For example, the registration control unit 18 registers biological information of the user in association with information on each operation screen in a log (history information) of various operation screens.

The determination unit 19 is a processing unit configured to determine whether or not the state of the user is normal, or the like.

1-3. Configuration of Wearable Terminal 50

Next, a configuration of the wearable terminal (also referred to as a wearable device) 50 will be described.

The wearable terminal 50 is a device capable of cooperating with the MFP 10 (the image processing apparatus). Specifically, the wearable terminal 50 is an information input/output terminal device (a digital assistant) capable of performing radio communication (short-range radio communication and network communication) with the MFP 10.

The wearable terminal 50 is a biological information detection device configured to detect (measure) biological information of the user (more specifically, biological information varying reflecting the state of the user (what can be called dynamic biological information)). Herein, a device capable of detecting (measuring) the blood pressure of the user as the biological information will be described as an example of the wearable terminal 50. Note that the wearable terminal 50 is not limited thereto, and may be a device configured to detect (measure) biological information other than blood pressure (for example, pulse wave, electrocardiogram, body temperature, and/or heart rate). The biological information is information time-varying reflecting the mental condition and/or the physical condition of the user. Note that the wearable terminal 50 is also referred to as a user state detection device or the like configured to detect the mental condition or the like of the user by using the biological information of the user.

Herein, a wristband type (wrist-worn) device will be described as an example of the wearable terminal 50. The wearable terminal 50, however, is not limited thereto, but various types of devices can be used as the wearable terminal 50.

Figure 3:
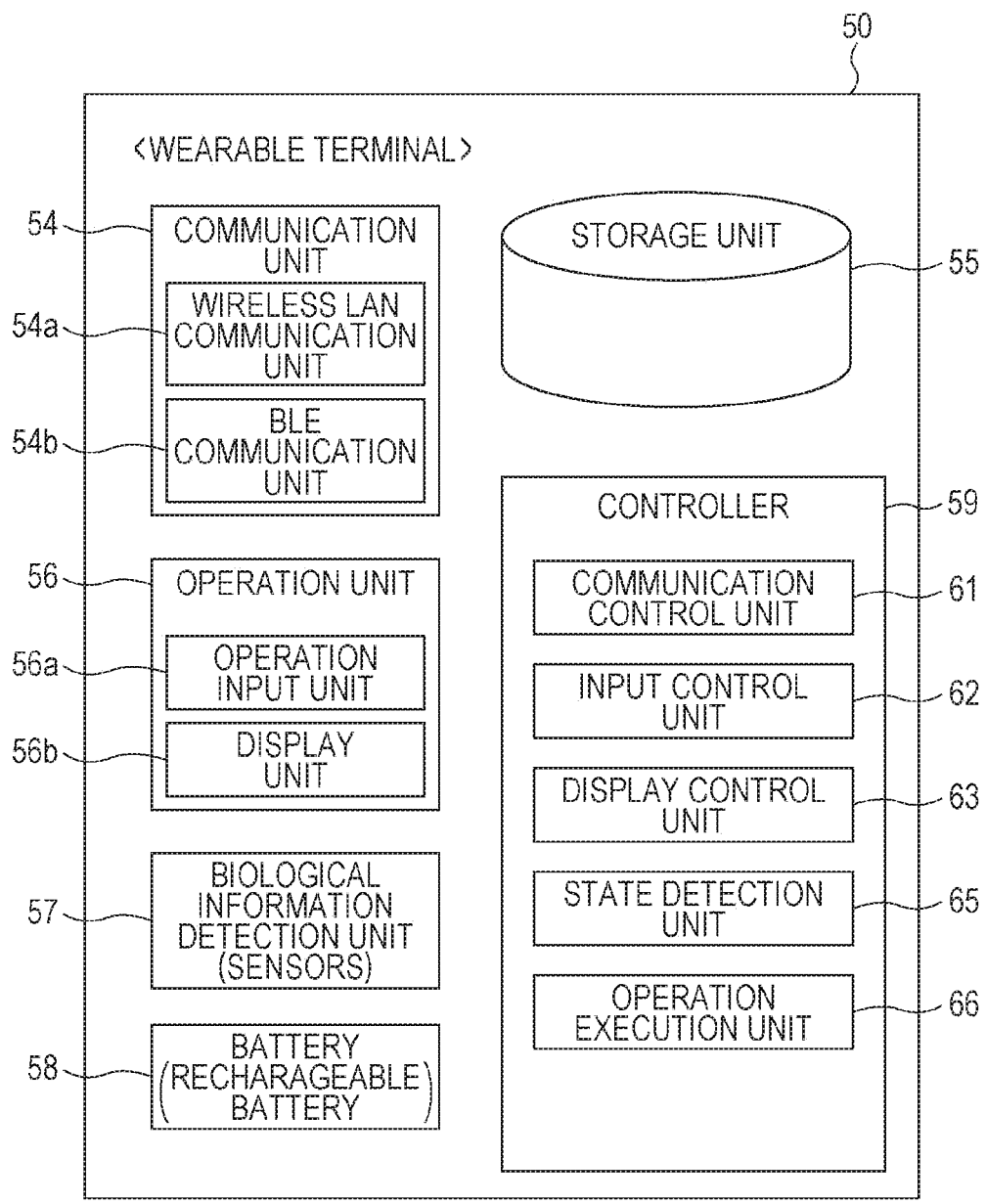
FIG. 3 is a functional block diagram illustrating a schematic configuration of a wearable terminal.

FIG. 3 is a functional block diagram illustrating a schematic configuration of the wearable terminal 50.

As illustrated in the functional block diagram of FIG. 3, the wearable terminal 50 includes a communication unit 54, a storage unit 55, an operation unit 56, a biological information detection unit 57, a battery 58, a controller 59 and the like, and implements various functions by operating the respective units in combination.

The communication unit 54 is capable of performing various types of radio communication (including radio communication using the BLE, and the like). Specifically, the communication unit 54 includes a wireless LAN communication unit 54a configured to perform radio communication using a wireless LAN (IEEE 802.11, and the like) and a BLE communication unit 54b configured to perform radio communication using the BLE.

The storage unit 55 includes a storage device such as a non-volatile semiconductor memory.

The biological information detection unit 57 includes various sensors for detecting biological information such as blood pressure.

The battery 58 is a secondary battery (rechargeable battery) that supplies power to the wearable terminal 50.

The operation unit 56 includes an operation input unit 56a configured to receive an operational input to the wearable terminal 50, and a display unit 56b configured to output display of various information items. The wearable terminal 50 is provided with a touch panel including a liquid crystal display panel and various sensors and the like embedded in the liquid crystal display panel. The touch panel functions as part of the operation input unit 56a and also as part of the display unit 56b.

The controller 59 in FIG. 3 is a control device included in the wearable terminal 50 and configured to generally control the wearable terminal 50. The controller 59 is a computer system including a CPU, various semiconductor memories (a RAM and a ROM), and the like. The controller 59 implements various processing units by the CPU executing predetermined software programs (programs) stored in a memory unit (such as a semiconductor memory). Note that the programs (more specifically, a group of program modules) may be recorded in a portable recording medium such as a USB memory, and read from the recording medium so as to be installed in the wearable terminal 50. Alternatively, the programs may be downloaded via a network or the like and installed in the wearable terminal 50.

Programs (cooperation programs) for cooperation with the MFP 10, and the like are installed in the wearable terminal 50. The cooperation programs are application software programs (also simply referred to as applications) for performing various processes (such as a process of detecting the user's state (biological information), and a process of transmitting the user's state).

Specifically, the controller 59 implements various processing units including a communication control unit 61, an input control unit 62, a display control unit 63, a state detection unit 65, and an operation execution unit 66, by executing cooperation programs and the like.

The communication control unit 61 is a processing unit configured to control operation for communication with the MFP 10 and the like in cooperation with the communication unit 54.

The input control unit 62 is a control unit configured to control operation of operational input to the operation input unit 56a (such as the touch panel).

The display control unit 63 is a processing unit configured to control display operation on the display unit 56b (such as the touch panel).

The state detection unit 65 is a processing unit configured to detect (measure) the biological information of the user in cooperation with the biological information detection unit 57.

The operation execution unit 66 is a processing unit configured to generally perform various cooperating operations with the MFP 10.

1-4. Other Devices

The server computer 80 (also simply referred to as a server) is a computer configured to store registration information (also referred to as "operation screen history information" or "operation screen information") containing information on an operation screen of the MFP 10 and the biological information of the user performing operation using the operation screen, which are associated with each other. Operation screen history information generated in the MFP 10 is not only stored in the MFP 10 but also transmitted to and stored (accumulated) in the server 80. Note that the server 80 may be a server provided in an office in which the MFP 10 is installed, or may be a server (such as a cloud server) provided outside of the office.

1-5. Operation Outline

<Start Job>

Figure 4:
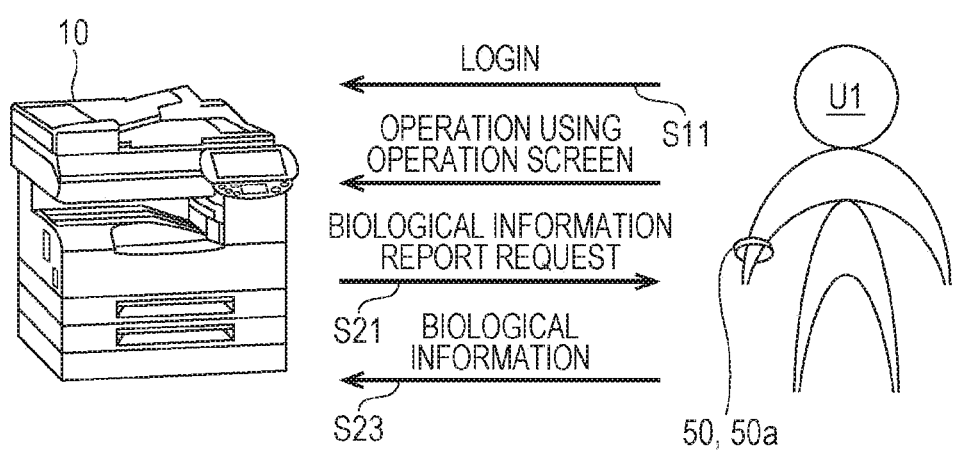
FIG. 4 is a diagram illustrating an outline of operation.
Figure 5:
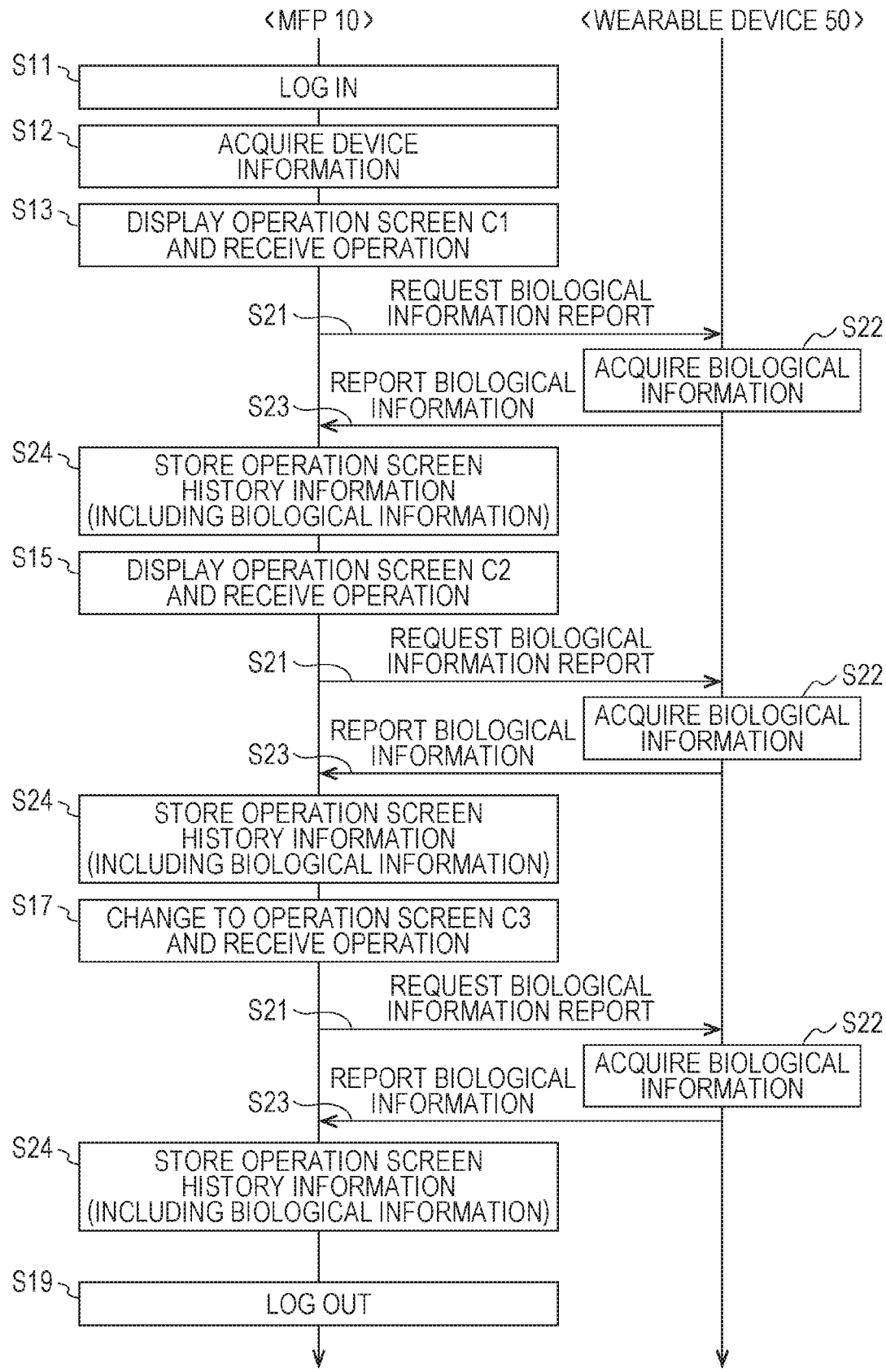
FIG. 5 is a timing chart illustrating operation relating to a job.

FIG. 4 is a diagram illustrating an outline of operation of the system 1, and more specifically, operation relating to various jobs (such as a copy job and a scan job). In addition, FIG. 5 is a timing chart illustrating the operation. Hereinafter, operation relating to a copy job will be described.

In step S11 (FIG. 5), a login process is performed. Specifically, a user (U1, for example) wearing the wearable terminal 50 operates the operation panel unit 6c of the MFP 10 to input his/her user authentication information (a user ID and a password, for example) on a login screen. If the MFP 10 has confirmed that the input user authentication information is valid, the MFP 10 permits login of the user U1.

Subsequently, in step S12, the MFP 10 acquires device information of the wearable terminal 50 worn by the user U1. Specifically, user information containing the valid login information (user authentication information) of the user U1 and the device information of the wearable terminal 50, which are associated with each other, is stored in the MFP 10 in advance, and the MFP 10 acquires the device information of the wearable terminal 50 of the login user U1 on the basis of the user information. More specifically, the device information (such as device identification information) of the wearable terminal 50) stored in association with the login user is extracted and acquired.

While the user information containing the login information of the user U1 and the device information of the wearable terminal 50, which are associated with each other, is stored in advance in the MFP 10 herein, the user information is not limited thereto, and may be stored in the server 80. The MFP 10 may then communicate with the server 80 to acquire the user information (in particular, the device information) stored in the server 80 from the server 80.

Figure 7:
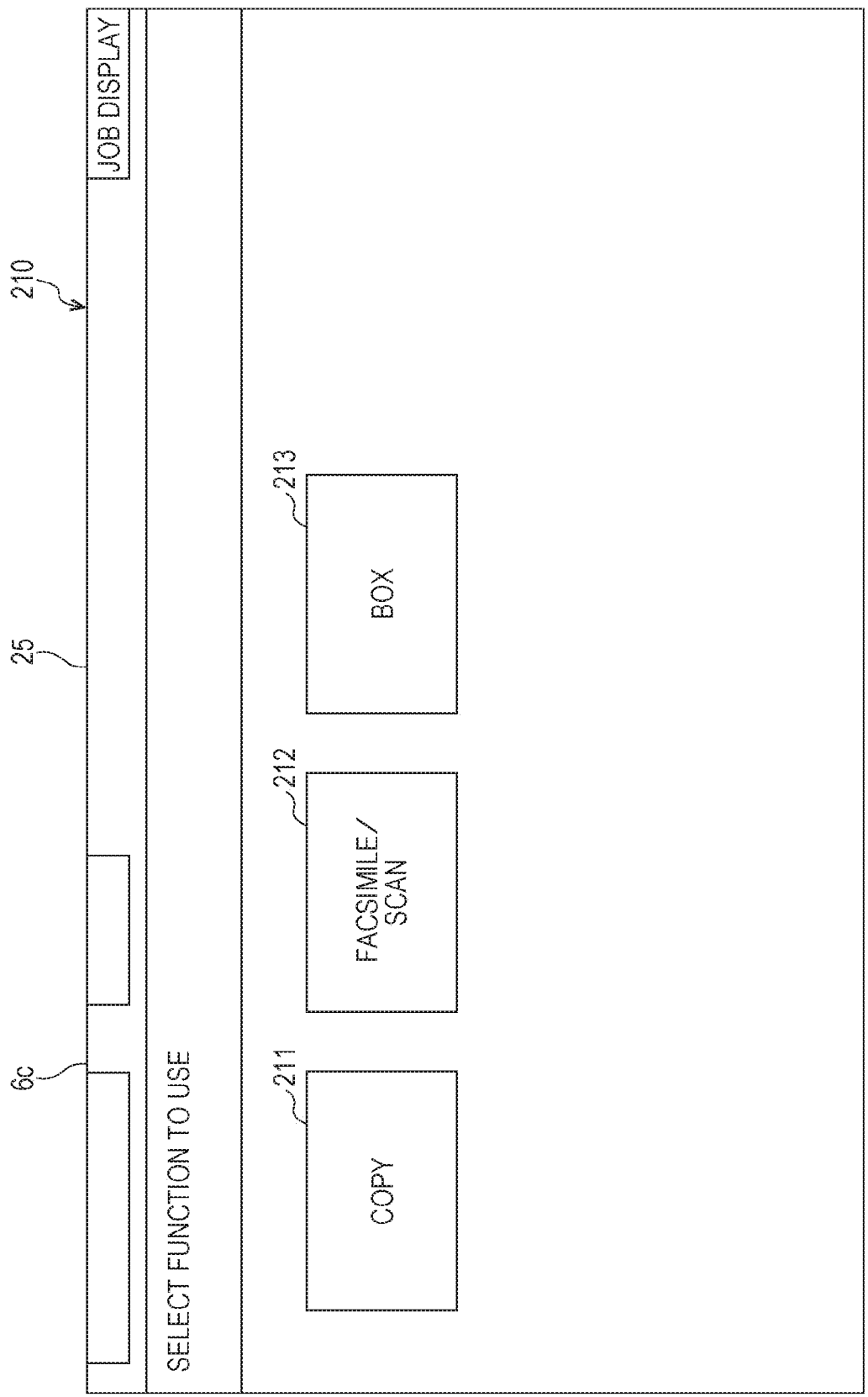
FIG. 7 is a diagram illustrating a main menu screen.
Figure 9:
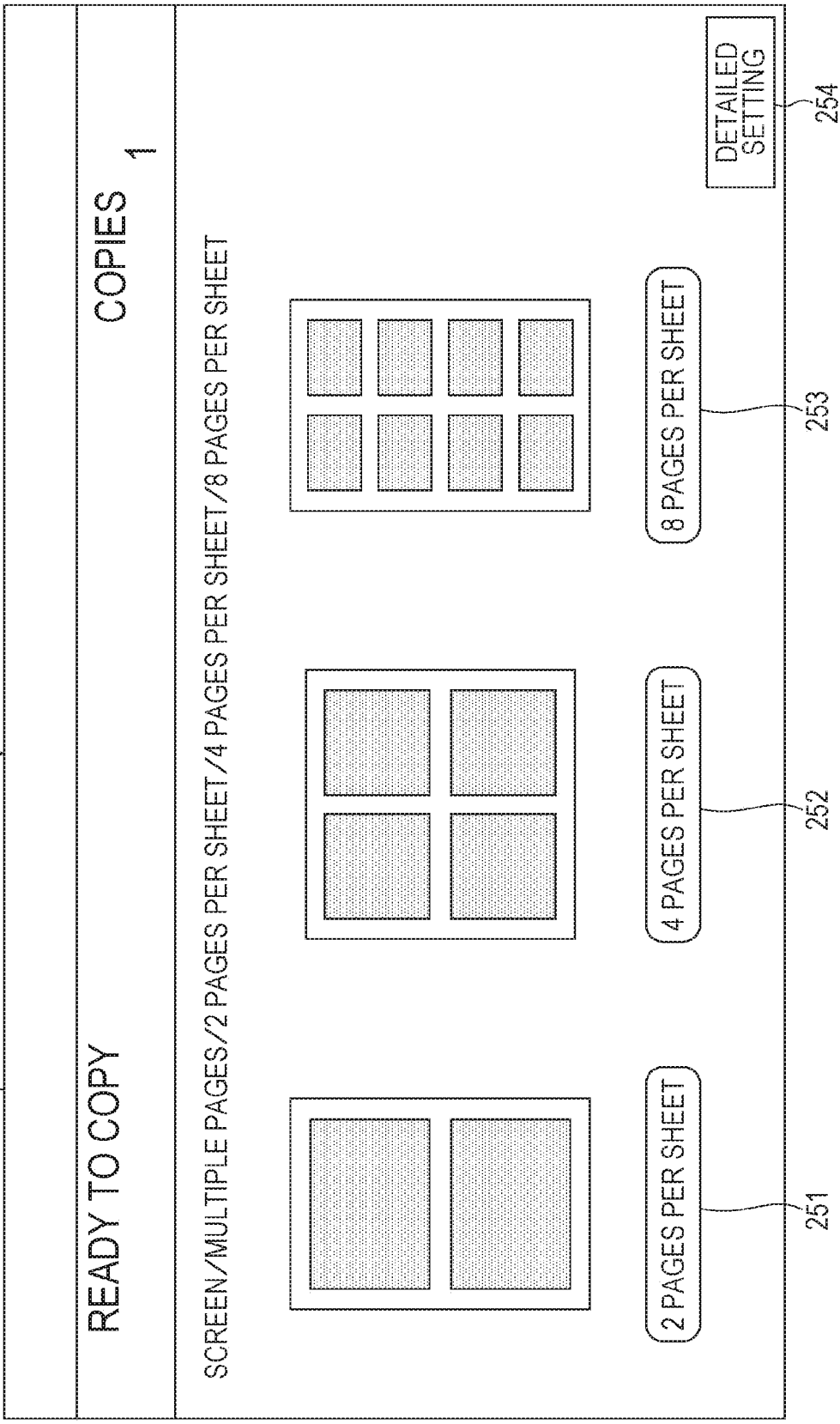
FIG. 9 is a diagram illustrating a detailed setting screen of "N pages per sheet"

Subsequently, the user U1 places an original document to be copied on the MFP 10 (the glass surface, the ADF, or the like), and performs various setting operations relating to a copy job by using operation screens C1 to C3 (210, 230, 250) (see FIGS. 7 to 9) and the like of the touch panel 25. For example, the user U1 performs operations such as pressing a copy button 211 on a main menu screen 210 (see FIG. 7) to display a menu screen (copy menu screen) 230 for copying (see FIG. 8), selecting an appropriate setting button (such as a "N pages per sheet" button 232) from the copy menu screen 230 and pressing the selected setting button to call a detailed setting screen 250 (see FIG. 9), and the like. As will be described below, in this embodiment, each time transition from an operation screen to another occurs, the biological information of the user is acquired from the wearable terminal 50 (steps S21 to S23) and registered in the operation screen history information (step S24).

<Operation on Operation Screen C1, Registration Process Relating to Operation Screen C1, and the Like>

Specifically, the first operation screen C1 (the main menu screen 210, for example) (see FIG. 7) is displayed on the touch panel 25, and operation on the first operation screen C1 is received. The user U1 selects a desired choice (the copy button 211, for example) from a plurality of options (operation buttons) 211 to 213 displayed on the operation screen C1 (210), and presses the selected operation button. The operation with the operation screen C1 is performed by the user U1 in this manner. Note that the operation of pressing the desired choice is also expressed as an instruction to switch the screen to the next operation screen C2 (the copy menu screen 230).

After the operation with the operation screen C1 is performed by the user U1 (more specifically, after the operation with the operation screen C1 is completed), the MFP 10 performs communication with the wearable terminal 50 in response to the operation of pressing the desired choice (the screen switching instruction) and the like to acquire biological information associated with the operation screen C1 (the biological information of the user U1) (steps S21 to S23).

More specifically, first, the MFP 10 transmits a biological information report request to the wearable terminal 50 (step S21). Subsequently, upon receiving the biological information report request, the wearable terminal 50 measures (detects) the biological information of the user U1 by using the biological information detection unit 57 (step S22). The wearable terminal 50 then transmits the measured biological information (the biological information of the user U1) to the MFP 10 (step S23). Note that the MFP 10 may perform communication with the wearable terminal 50 by using the device information received in advance in step S12.

In this manner, the MFP 10 acquires the biological information measured by the wearable terminal 50 (the wearable device) worn by the user U1 from the wearable terminal 50 through communication with the wearable terminal 50. In other words, the MFP 10 acquires the biological information measured immediately after transition from the operation screen C1 to another operation screen from the wearable terminal 50. Herein, the biological information measured immediately after transition from the operation screen C1 to another screen is information reflecting the state of the user performing operation using the operation screen C1. Thus, in the present application, not only biological information measured within a period during which the operation screen C1 is displayed but also biological information measured immediately after transition from the operation screen C1 to another screen is regarded as the biological information measured within a period corresponding to the period during which the operation screen C1 is displayed. The above also applies to other operation screens C2 and C3 (which will be described below) and the like.

Furthermore, the MFP 10 registers the biological information received in step S23 in association with the operation screen C1 in the operation screen history information (step S24).

Specifically, the MFP 10 stores (registers) information containing information on the operation screen C1 to be operated and the biological information of the user who performs operation using the operation screen C1 in association with each other as operation screen history information (operation screen information) into the storage unit 5 of the MFP 10. Furthermore, the MFP 10 transmits and stores (registers) the operation screen history information to and into the server 80. As described above, the MFP 10 performs the operation of registering the operation screen history information both in the MFP 10 and in the server 80.

FIG. 6 is a table showing an example of the operation screen history information. As shown in FIG. 6, the operation screen history information contains information on the operating user and information on the operation screen (more specifically, the screen ID of the operation screen), and also contains the biological information acquired in steps S21 to S23.

For example, on the first row from the top in FIG. 6, information as follows relating to the first operation screen C1 (see FIG. 7) is registered. Specifically, information on the user performing operation using the operation screen ("user U1" (more specifically, the user ID of the user)) and the screen ID of the operation screen (the screen ID indicating the operation screen C1) are stored. In addition to the information on the operation screen, biological information (for example, blood pressure="120" (mmHg)) measured in association with the operation screen C1 and the measurement time of the biological information ("2015/11/15 12:00") are registered. In other words, the information on the operation screen C1 and the biological information of the user are registered in association with each other.

<Operation on Operation Screen C2, Registration Process Relating to Operation Screen C2, and the Like>

In addition, after a desired choice (the copy button (copy menu display button) 211, for example) is selected from a plurality of options in the first operation screen C1 (the main menu screen 210, for example) (see FIG. 7), the screen is changed to the next operation screen C2 (the copy menu screen 230, for example) (see FIG. 8) (step S15). Operation on the operation screen C2 is then received (step S15).

Specifically, the user U1 selects a desired choice (the "N pages per sheet" button 232, for example) from a plurality of options (operation buttons) displayed on the operation screen C2, and presses the selected operation button. Note that the operation of pressing the desired choice is also expressed as an instruction to switch the screen to the next operation screen C3 (the detailed setting screen 250 of "N pages per sheet").

After the operation with the operation screen C2 is performed by the user U1, the MFP 10 performs communication with the wearable terminal 50 in response to the operation of pressing the desired choice (such as the button 232) (the screen switching instruction) and the like to acquire biological information associated with the operation screen C2 (the biological information of the user U1) (steps S21 to S23).

The MFP 10 then registers the biological information received in step S23 in association with the operation screen C2 in the operation screen history information (step S24).

For example, on the second row from the top in FIG. 6, information as follows relating to the second operation screen C2 (see FIG. 8) is registered. Specifically, information on the user performing operation using the operation screen ("user U1" (more specifically, the user ID of the user)) and the screen ID of the operation screen (the screen ID indicating the operation screen C2) are stored. In addition to the information on the operation screen, biological information (for example, blood pressure="200" (mmHg)) measured in association with the operation screen C2 and the measurement time of the biological information ("2015/11/15 12:02") are registered.

<Operation on Operation Screen C3, Registration Process Relating to Operation Screen C3, and the Like>

In addition, after a desired choice (the "N pages per sheet" button 232, for example) is selected from a plurality of options in the second operation screen C2 (the copy menu screen 230, for example) (see FIG. 8), the screen is changed to the next operation screen C3 (the detailed setting screen 250 of "N pages per sheet," for example) (see FIG. 9) (step S17). Operation on the operation screen C3 is then received (step S17).

Specifically, the user U1 selects a desired choice (a "4 pages per sheet" button 252, for example) from a plurality of options (operation buttons) 251 to 254 displayed on the operation screen C3, and presses the selected operation button.

After the operation with the operation screen C3 is performed by the user U1, the MFP 10 performs communication with the wearable terminal 50 in response to the operation of pressing the desired choice (such as the button 252) (the screen switching instruction) and the like to acquire biological information associated with the operation screen C3 (the biological information of the user U1) (steps S21 to S23).

The MFP 10 then registers the biological information received in step S23 in association with the operation screen C3 in the operation screen history information (step S24).

For example, on the third row from the top in FIG. 6, information as follows relating to the third operation screen C3 is shown. Specifically, information on the user performing operation using the operation screen C3 ("user U1" (more specifically, the user ID of the user)) and the screen ID of the operation screen (the screen ID indicating the operation screen C3) are stored. In addition to the information on the operation screen, biological information (for example, blood pressure="130" (mmHg)) measured in association with the operation screen C3 and the measurement time of the biological information ("2015/11/15 12:03") are registered.

Thereafter, after similar operations are further performed and various setting operations relating to the copy job are completed, the user U1 presses a start button (not illustrated) of the operation panel unit 6c to give a copy start instruction to the MFP 10.

In response to the copy start instruction, the MFP 10 starts a copy process (a process of reading the original document to generate a scanned image, and performing printing and output on the basis of the scanned image). After the copy process is completed the user U1 performs a logout operation, and the MFP 10 performs a logout process in response to the logout operation (step S19).

1-6. Effects of Present Embodiment, and the Like

As described above, in the embodiment, each item of biological information of the user (such as U1) operating each of the operation screens for a copy job of the MFP 10 is registered in association with the operation screen (see the operation screen history information (FIG. 6)). Thus, information leading to improvement of operation screens can be easily collected. More specifically, since the mental condition or the like of the user performing operation using an operation screen is obtained, the user's state of anxiety or the like (a state in which the user feels stressed and/or frustrated, or the like) about the operation screen can be recognized through post-analysis or the like. As a result, a problem with the operation screen can be found (a problem relating to the operation screen can be extracted), and improvement of the operation screen can be considered. This can further improve customer satisfaction.

For example, as shown in FIG. 6, if the fact that the user biological information (blood pressure "200") at a time point when one operation screen C2 (the copy menu screen 230) among three operation screens C1, C2, and C3 is operated is higher than the user biological information at a time point when any other operation screen (such as the main menu screen 210) is operated (and/or largely deviated from a normal level) is recognized, it is estimated that there is room for improvement in the operation screen C2. In other words, if the state of the user is determined not to be in a normal condition as a result of determination on whether or not the state of the user is in a normal condition on the basis of the user biological information (the operation screen history information), it is estimated that there is room for improvement in the associated operation screen.

In addition, information registered in the MFP 10 is also transmitted to and registered in the server 80. Furthermore, as a result of repetition of similar operation, a plurality of biological information items relating to a plurality of operation screens are accumulated in the server 80.

In particular, when a plurality of (preferably a large number of) biological information items on a plurality of (preferably a large number of) operation screens of the same type or different types are registered, the characteristics of typical mental condition or the like of the user can be recognized for each of the operation screens on the basis of the relation between the biological information items and the operation screens. In other words, when the state of the user for each operation screen is obtained, improvement specific to an operation screen can be found.

Note that the number of persons to be measured (users) for the operation screens may be one but is preferably more than one. When biological information items of a plurality of users are registered, a tendency independent of a particular user (a tendency of biological information relating to a plurality of living bodies) can be obtained. Thus, dependency on a user is eliminated and a more general tendency can be obtained.

In addition, in the embodiment described above, the MFP 10 switches display between a plurality of operation screens, acquires each biological information item measured during a period during which each of the operation screens is displayed (more exactly, around the display period), and registers the biological information item in association with information on the operation screen. The MFP 10 thus can easily obtain biological information associated with each of a plurality of operation screens.

Furthermore, in the embodiment described above, each biological information item of the user relating to each operation screen is measured at a specific timing (a specific stage) of the operation screen (more specifically, at a time point immediately after transition from the operation screen to another screen). Thus, variation in the timing of measuring biological information for each operation screen can be avoided. Thus, variation in results of measurement of biological information caused by the variation in the measurement timing can be avoided. Thus, a plurality of measurement results (biological information items) for each operation screen under the same conditions can be obtained.

1-7. Modified Examples of First Embodiment

<Information on Operation of Operation Buttons>

While only the screen ID of an operation screen is registered as information on the operation screen in the above-described embodiment, the information on an operation screen is not limited thereto, and other information items (such as information describing an operation in the operation screen (such as "button B1 pressed")) may also be registered (see FIG. 10). In other words, each time an operation button on an operation screen is pressed by the user, the biological information of the user associated with the operation of the operation button may be measured and registered in association with the operation of the operation button. When the information (also referred to as operation information) describing operation on an operation screen, or the like is registered in association with the biological information of the user, a problem (improvement) or the like in each operation (each operation button) can be found.

FIG. 10 is a table showing operation screen history information according to the modified example.

In the operation screen history information in FIG. 10, "button B1 pressed" is registered as an operation during the period during which the operation screen C1 (specifically, the screen 210) is displayed. Furthermore, biological information "120" measured in response to pressing of the button B1 (211) (biological information measured at a time point corresponding to the operation "button B1 pressed") is registered in association with information (the screen ID of the screen C1) of the associated operation screen C1 and the associated operation button B1.

In addition, "button B3 pressed" is registered as an operation during the period during which the operation screen C3 (specifically, the screen 250) is displayed. Furthermore, biological information "130" measured in response to pressing of the button B3 (252) (biological information measured at a time point corresponding to the operation "button B3 pressed") is registered in association with information (the screen ID of the screen C3) of the associated operation screen C3 and the associated operation button B3.

Furthermore, pressing of two buttons B21 (a "full color" button 231) and B22 (an "N pages per sheet" button 232) during the period during which the operation screen C2 (specifically, the screen 230) is displayed is registered. Furthermore, biological information "160" measured in response to pressing of the button B21 (biological information measured at a time point corresponding to the operation "button B21 pressed") is registered in association with information of the associated operation screen C2 and the associated operation button B21. Similarly, biological information "200" measured in response to pressing of the button B22 (biological information measured at a time point corresponding to the operation "button B22 pressed") is registered in association with information of the associated operation screen C2 and operation information on the pressing of the associated operation button B22. As described above, in the operation screen history information in FIG. 10, the screen ID (screen identification information), each of a plurality of operation information items, and each of a plurality of biological information items are registered in association with one another for the operation screen C2.

As shown in FIG. 10, if the fact that the user biological information (the blood pressure, for example) ("160" and "200") at a time point when one operation screen C2 (the copy menu screen 230, for example) among three operation screens C1, C2, and C3 is operated is higher than the user biological information at a time point when any other operation screen (the main menu, for example) (largely deviated from a normal level) is recognized, it is estimated that there is room for improvement in the specific operation screen. In particular, the fact that the user biological information (the blood pressure "200," for example) at the time point when the button B22 (specifically, the "N pages per sheet" button 232) among the operation buttons (operation members) to be operated on the specific operation screen is deviated from a normal level by a predetermined level or larger is recognized. It is estimated on the basis of the above that there is room for improvement in the operation of the operation button B22 among a plurality of operation buttons on the operation screen.

<Other Specific Timings for Measuring Biological Information>

Furthermore, while the biological information of the user is measured at specific timing (a specific stage) described above (more specifically, at a time point immediately after screen transition from an operation screen to another screen, at a time point immediately after an operation button in the operation screen is pressed, or the like) in the embodiment described above, the timing of the measurement is not limited thereto and may the biological information of the user may be measured at other specific timings.

For example, another specific timing may be at a time point after a predetermined time (a few seconds, for example) has passed from a time point when display of an operation screen is started.

Furthermore, the biological information of the user may also be measured at login (step S11), at a time point immediately after acquisition of the device information (step S12), at logout (step S19), and/or the like, and information acquired at at least one of these time points may also be registered in the operation screen history information.

<Registration of Some of Biological Information Items Relating to Plurality of Operation Screens>

In addition, while all of biological information items are registered when a plurality of biological information times are measured at a plurality of time points within a period during which operation with a plurality of operation screens is performed in the embodiment described above, the registration is not limited thereto. Only some of a plurality of biological information items may be registered when the biological information items are measured at a plurality of time points within a period during which operation with one or more operation screens is performed.

For example, in a case where a plurality of biological information items are measured at a plurality of time points corresponding to operation periods during which a plurality of operation screens are used, only biological information items resulting from changes by a predetermined level or larger from the biological information items most recently registered, among at least one biological information item acquired within a period during which one operation screen is operated, may be registered in association with information on the operation screen (the associated operation screen). To put it briefly, only biological information at a time point when a relatively large change has occurred may be registered. FIG. 11 is a table showing an example of such registration. In the example of registration in FIG. 11, in a case where such information items as shown in FIG. 10 are present as registration candidate information items, only some of the registration candidate information items are registered.

More specifically, as shown in FIG. 11, the biological information "120" measured during a period during which an operation screen is operated (biological information at login) is registered, and only some of biological information items resulting from changes by a predetermined level ("50," for example) or larger from the biological information registered most recently among other biological information items measured after the biological information at login may be registered. Specifically, the biological information (the biological information "160" when the button B21 is pressed), which is not resulting from a change by "50" or larger from the first registered biological information "120" is not registered, and the biological information (the biological information "200" when the button B22 is pressed) resulting from a change by "50" or larger from the first registered biological information "120" is registered next. Thereafter, the biological information (the biological information "130" when the button B3 is pressed) resulting from a change by "50" or larger from the most recently registered biological information "200" is registered next. As described above, only three biological information items (specifically, the reference biological information "120," and the biological information items "200" and "130" resulting from relatively large changes thereafter) among the four biological information items may be registered.

This allows reduction in the number of data to be registered.

<Measurement of Biological Information at Predetermined Time Intervals>

Furthermore, while the biological information of the user is measured at a specific stage of each operation screen (at a time point immediately after screen transition from the operation screen to another screen, at a time point immediately after an operation button on the operation screen is pressed, or the like) in the embodiments described above, the timing of the measurement is not limited thereto.

For example, the biological information of the user may be measured at predetermined time intervals (at intervals of a few seconds to several tens of seconds, for example) within a period relating to one job (a login period from login to logout, a period from a start of operation on the first operation screen to an end of operation on the last operation screen, or the like). Each of a plurality of biological information items measured at predetermined time intervals may then registered in association with the associated operation screen.

FIG. 12 is a table showing operation screen history information containing such registered information. In the operation screen history information in FIG. 12, each of a plurality of biological information items measured at predetermined time intervals (at intervals of one minute herein) is registered with the associated operation screen.

While "operation information" (such as information on pressing of an operation button) is not registered in FIG. 12, the registered information is not limited thereto, and "operation information" (such as pressing of an operation button) associated with biological information to be registered may also be registered. More specifically, for example, an operation button pressed immediately after a time point when each biological information item (such as blood pressure) to be registered is measured (detected) may be registered as "operation information" of the biological information item.

<Registration of Some of Plurality of Biological Information Items Measured at Predetermined Time Intervals>

In addition, all of a plurality of biological information items measured at predetermined time intervals may not need to be registered, and only some of the biological information items may be registered.

For example, some of a plurality of biological information items measured at predetermined time intervals (specifically, such as only one biological information item (a maximum level or a minimum level) with a largest difference from a normal level within a display period of each operation screen) may be registered in association with the associated operation screen.

Alternatively, in a case where a plurality of biological information items are measured at predetermined time intervals, one of the biological information items may be registered in association with information on one operation screen, and only biological information items resulting from changes by a predetermined level or larger from the most recently registered biological information items among at least one biological information item measured after the one of the biological information items may be registered in association with the one operation screen. To put it briefly, only biological information at a time point when a relatively large change has occurred may be registered.

More specifically, as shown in FIG. 12, the biological information "120" measured during a period during which an operation screen is operated (biological information at login) is registered, and only some of biological information items resulting from changes by a predetermined level ("50," for example) or larger from the biological information registered most recently among other biological information items measured after the biological information at login may be registered. Specifically, the biological information "160," which is not resulting from a change by "50" or larger from the first registered biological information "120" is not registered, and the biological information "200" resulting from a change by "50" or larger from the first registered biological information "120" is registered next. Thereafter, the biological information "130" resulting from a change by "50" or larger from the most recently registered biological information "200" is registered next. As described above, only three biological information items (specifically, the reference biological information "120," and the biological information items "200" and "130" resulting from relatively large changes thereafter) among the four biological information items may be registered.

This allows reduction in the number of data to be registered.

2. Second Embodiment

A second embodiment is a modified example of the first embodiment. In the following, differences from the first embodiment will be mainly described.

While a technology of accumulating operation screen history information (in particular, relatively a large number of operation information items (operation history information items) relating to an operation screen and statistically analyzing the operation screen history information to lead to improvement in the operation screen has been mainly described in the first embodiment, the technology leading to the improvement is not limited thereto.

In the second embodiment, a technology of using operation screen history information to automatically lead to improvement of an operation screen in a relatively short time (in real time) will be described.

In the second embodiment, the MFP 10 determines whether or not the state of the user who performed operation using each operation screen is in a normal condition on the basis of user biological information (operation screen history information) measured by the wearable terminal 50. For example, whether or not the state of the user is in a normal condition is determined on the basis of whether or not the difference between an index value (blood pressure, for example) indicating the biological information of the user and the normal level of the index is a predetermined level or larger.

More specifically, if the difference between an index value (such as a measured blood pressure level) measured within a period of operation on an operation screen to be evaluated and the index value under a normal condition of the user (such as a normal blood pressure level) is equal to or larger than a threshold, the state of the user is determined not to be in the normal condition (being in an abnormal condition). Note that the index value (such as the normal pressure level) under the normal condition of the user may be measured and registered in advance for each user. Alternatively, an index value of typical users (such as an average value of blood pressure levels) may be registered as an index value (such as a normal blood pressure level) under the normal condition of each user.

Figure 13:
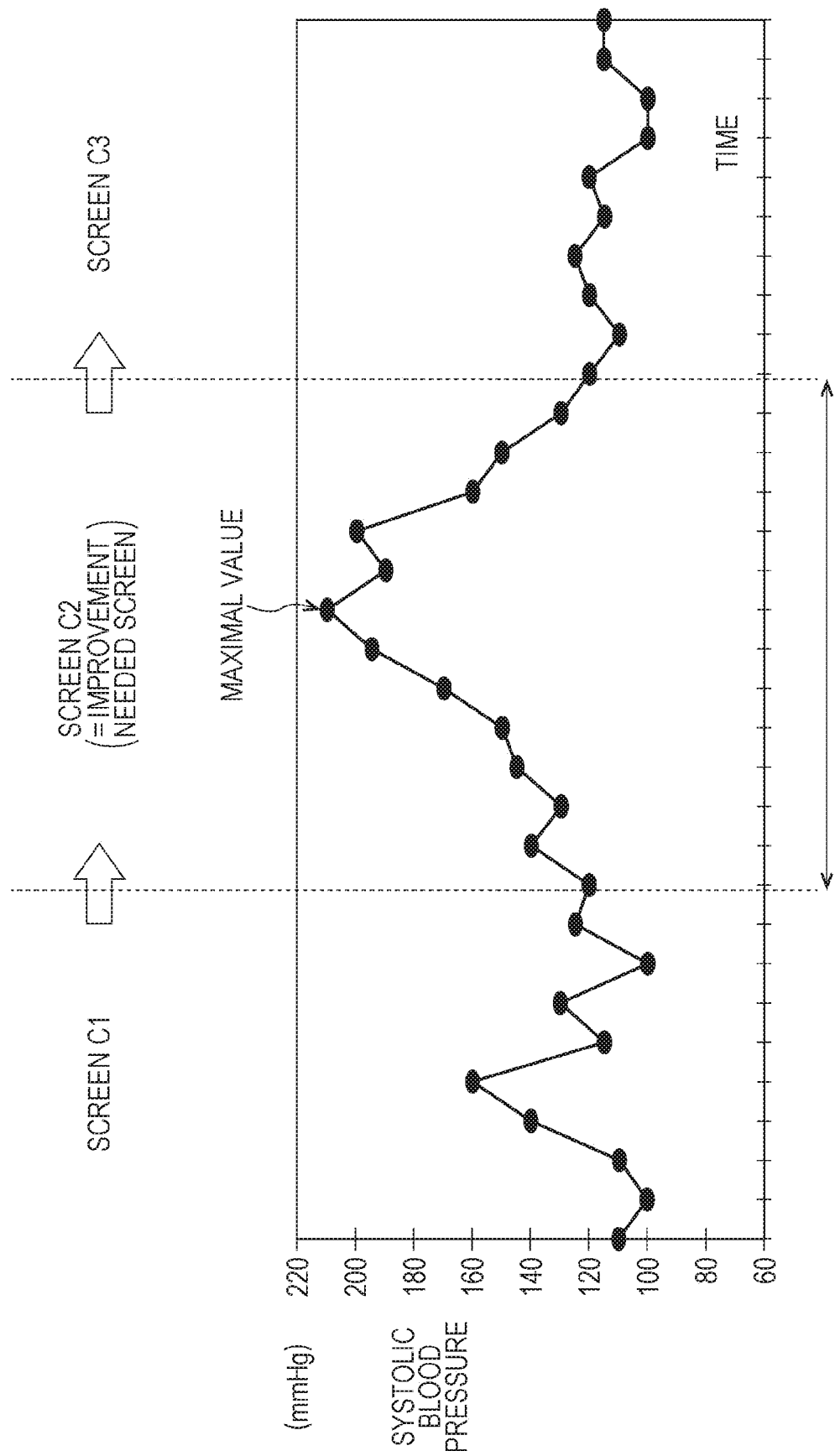
FIG. 13 is a graph showing variation in biological information with time.

FIG. 13 is a graph showing variation in biological information with time. In FIG. 13, the biological information of the user (more specifically, systolic blood pressure) is measured at predetermined time intervals (at intervals of a few seconds, for example). Herein, a maximum value of a plurality of biological information items (such as blood pressures) measured at predetermined time intervals within a period during which each operation screen is operated (a period corresponding to the period during which each operation screen is displayed) is compared with a normal level, and whether or not the user state relating to the operation of the operation screen is normal is determined.

Alternatively (or additionally), whether or not the state of the user performing operation using each operation screen is in a normal condition may be determined depending on whether or not the state of the user has changed by a predetermined level or larger during the period during which the operation screen is operated (whether or not the difference between a minimum value and a maximum value within the operation period is a predetermined value or larger).

If the state of the user within the period during which the operation screen is operated is determined not to be in the normal condition on the basis of the biological information of the user, the MFP 10 (the determination unit 19 or the like) determines the operation screen to be an "improvement needed screen" (a screen that needs improvement). Furthermore, the MFP 10 determines an operation button operated on the "improvement needed screen" to be an "improvement needed button" (a button that needs improvement). More specifically, an operation button pressed immediately after a time point when the biological information (blood pressure) determined to be abnormal is measured (detected) is determined to be an "improvement needed button."

For example, a very large number of options are arranged on the operation screen C2 (the screen 230). Thus, each user (such as U1) may feel it difficult to find (feel uneasy in finding) a desired button during operation on the operation screen C2 (the screen 230) (see FIG. 8). In addition, in such situations, the blood pressure or the like of the user tends to be a level very different from a normal level. In this embodiment, measurement of the biological information of the user allows detection of such a situation.

Specifically, in a case as shown in FIG. 13, the maximum value "215" of the blood pressure (systolic blood pressure) within a period during which the operation screen C2 (the screen 230) is operated is higher than the normal level by a predetermined level or larger. In this case, the state of the user U1 within the period during which the operation screen C2 is operated is determined not to be in a normal condition on the basis of the biological information (the operation screen history information) of the user U1. The MFP 10 then determines the operation screen C2 to be an "improvement needed screen." Furthermore, the MFP 10 (the determination unit 19 or the like) determines an operation button operated on the "improvement needed screen" C2 to be an "improvement needed button" (a button that needs improvement). More specifically, the operation button (the "N pages per sheet" button 232, for example) recorded as being associated with the blood pressure value "215" in the operation screen history information is determined to be an "improvement needed button."

Furthermore, when the operation screen C2 (the copy menu screen 230 herein) determined to be the improvement needed screen is called again in response to a user operation and displayed as a new operation screen on the touch panel 25, the MFP 10 adds a display of guidance (which will be described below) relating to the improvement needed button (the "N pages per sheet" button 232) to the new operation screen (230). Thus, the display of guidance is added in the next operation.

Figure 14:
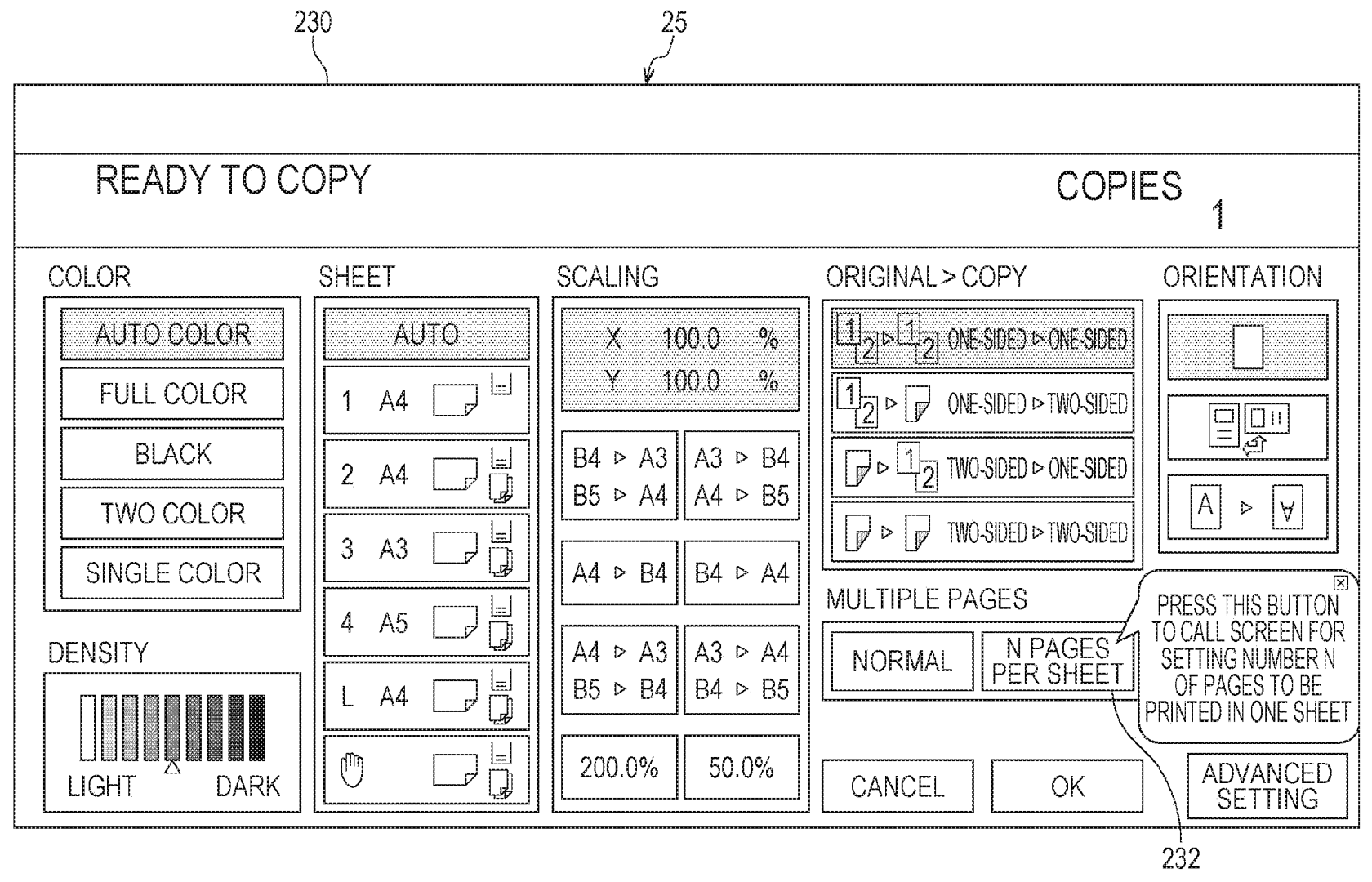

FIG. 14 is a diagram illustrating an example of the display of guidance. As illustrated in FIG. 14, a text ("press this button to call screen for setting number N of pages to be printed on one sheet") explaining the "N pages per sheet" button 232 (the operation button determined to be an improvement needed button) is written on the right of the operation button 232.

This allows the user U1 to find out the button 232 relatively easily the next time when the user U1 uses the copy menu screen 230 since the guidance about the "N pages per sheet" button 232 is displayed on the copy menu screen 230. Thus, the user-friendliness of the operation screen C2 can be improved. Furthermore, in a case where the blood pressure level has risen because of uneasiness felt regarding the associated operation of the button 232, viewing the display of guidance (the text) may reduce the uneasiness. In this sense as well, the user-friendliness of the operation screen C2 can be improved. In other words, the user friendliness of the button 232, in particular, can be improved.

While the guidance (the text for explanation or the like) of the operation button 232 is output for display by the touch panel 25, the display control unit 13, and the like herein, the guidance is not limited thereto. For example, the guidance of the operation button 232 may be output as audio by an audio output unit, the input/output control unit 14, and the like of the MFP 10.

Furthermore, in the second embodiment, when an improvement needed screen is called again in response to a user operation and displayed as a new operation screen after determination of the improvement needed screen and an improvement needed button (more specifically, the presence of such a button), a display of guidance about the improvement needed button is added to the new operation screen; however, improvement needed button is not limited thereto.

Figure 15:
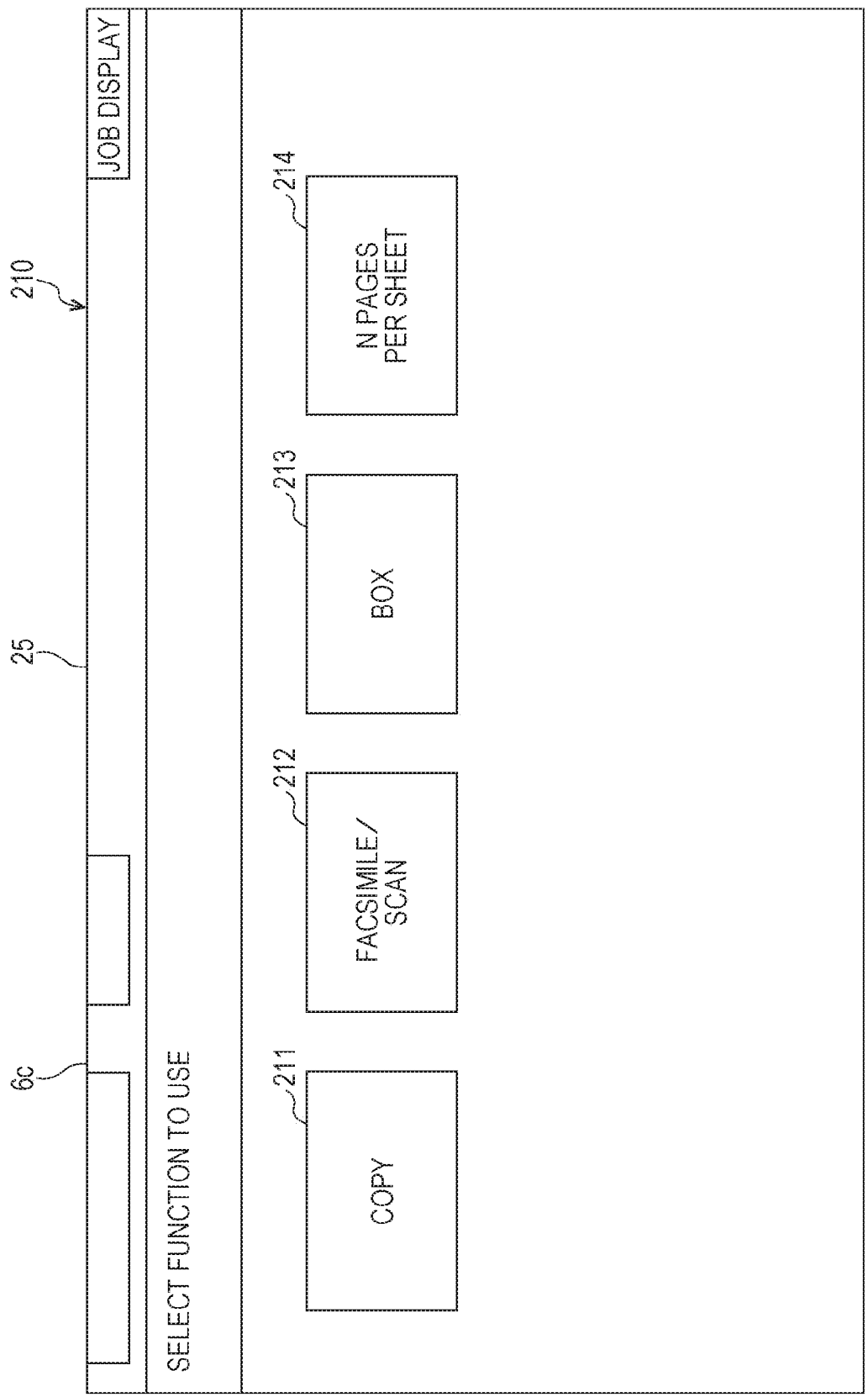
FIG. 15 is a diagram illustrating a state in which a call button is added to a menu screen.

For example, after determination of an improvement needed screen and an improvement needed button, a call button 214 for calling an operation screen 250 (FIG. 9) regarding the improvement needed button 232 may be added as a shortcut key to the main menu screen 210 (see FIG. 7) (see FIG. 15). FIG. 15 illustrates a state in which the call button (call key) 214 is additionally displayed as a shortcut key on the main menu screen 210. Note that the main menu screen 210 is a screen at a higher level than the copy menu screen 230. The main menu screen 210 is a screen capable of being customized for each user, for example. The main menu screen 210, however, is not limited thereto, and a call button 214 may be added to the main menu screen 210 in common use for a plurality of users.

Figure 8:
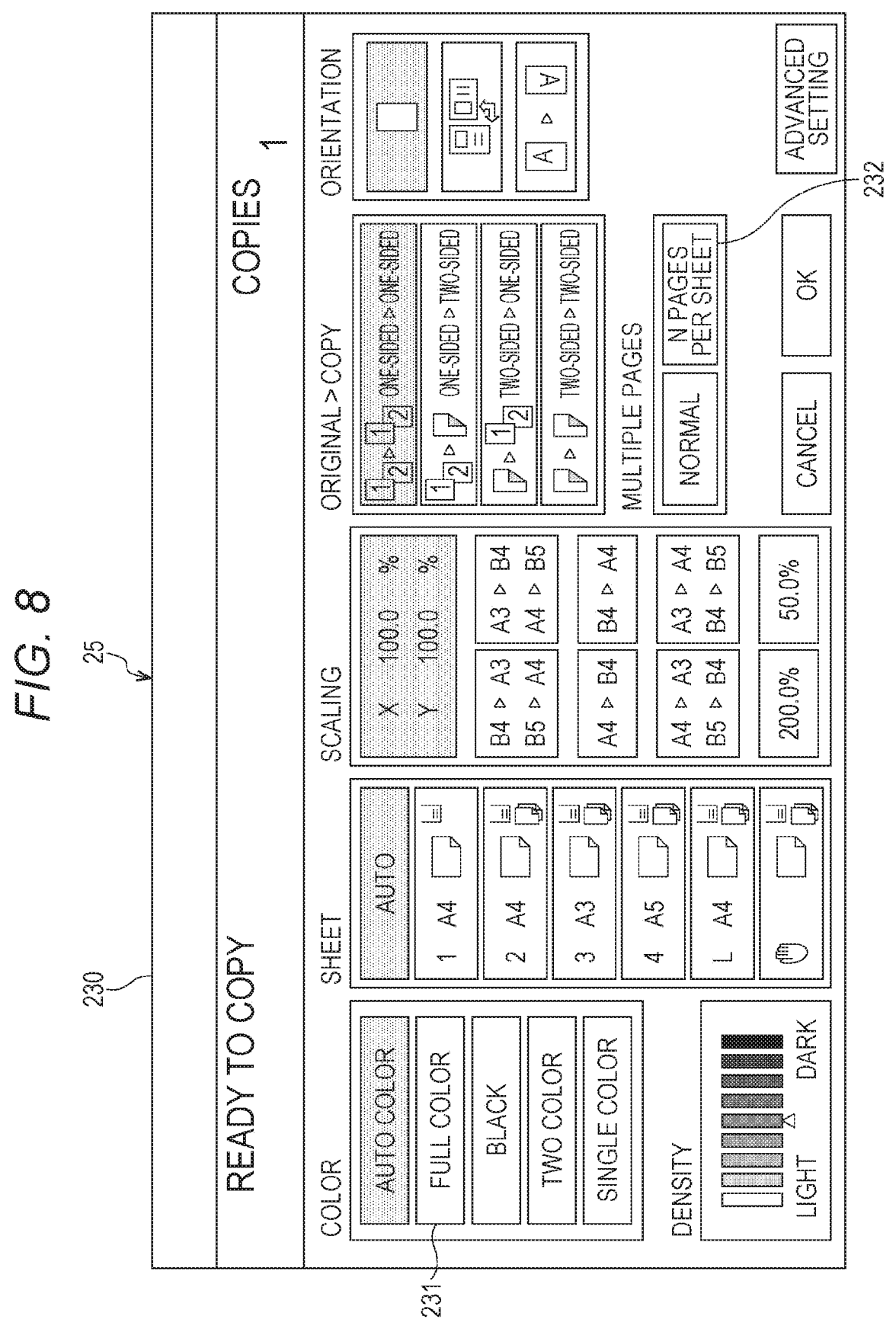

Use of such a call button 214 (FIG. 15) allows the user U1 to directly call the detailed setting screen 250 of "N pages per sheet" from the main menu screen 210 without using the copy menu screen 230 (see FIG. 8). In other words, among three operation screens 210, 230, and 250, transition from the operation screen 210 at the highest level (the uppermost level) to the operation screen 250 at the lowest level (the lowermost level) can be performed without using the operation screen 230 at an intermediate level. When the operation screen 230, which is relatively difficult to use, is not used, the user U1 can perform operation without being greatly stressed.

While the call button 214 for calling the operation screen relating to the improvement needed button (232) is added to the main menu screen 210 herein, the main menu screen 210 is not limited thereto. For example, in a case where the improvement needed button is a button for direct setting (without calling an operation screen) (the "full color" button 231, for example) or the like, the improvement needed button (231, and the like) itself may be added to the main menu screen 210.

3. Modified Examples, and the Like

While some embodiments of the present invention have been described above, the invention is not limited to those described above.

While the operation screen history information is registered substantially at the same time in the MFP 10 and in the server 80 in the embodiments described above, the registration is not limited thereto, and information (including the biological information) relating to each operation screen may be once registered in the MFP 10 at end of a period during which the operation screen is operated and be registered in the server 80 at another timing thereafter. More specifically, information relating to each operation screen may be once stored in the MFP 10 at end of a period during which the operation screen is operated, and be transmitted from the MFP 10 to the server 80 and stored in the server 80 at periodic transmission timing (at 10 pm every day, for example).

Furthermore, while the operation screen history information is registered in both of the MFP 10 and the server 80 herein in the embodiments described above, the registration is not limited thereto, and the operation screen history information may be stored in only one of the MFP 10 and the server 80.

Furthermore, while the MFP 10 acquires biological information measured by the wearable terminal 50 (the wearable device) worn by the user U1 from the wearable terminal 50 through communication with the wearable terminal 50 (steps S21 to S23, and the like) in the embodiments described above, the acquisition is not limited thereto.

For example, the MFP 10 may acquire biological information measured by the wearable terminal 50 worn by the user U1, and transferred to and stored in the server 80 from the server 80 through communication with the server 80.

Figure 16:
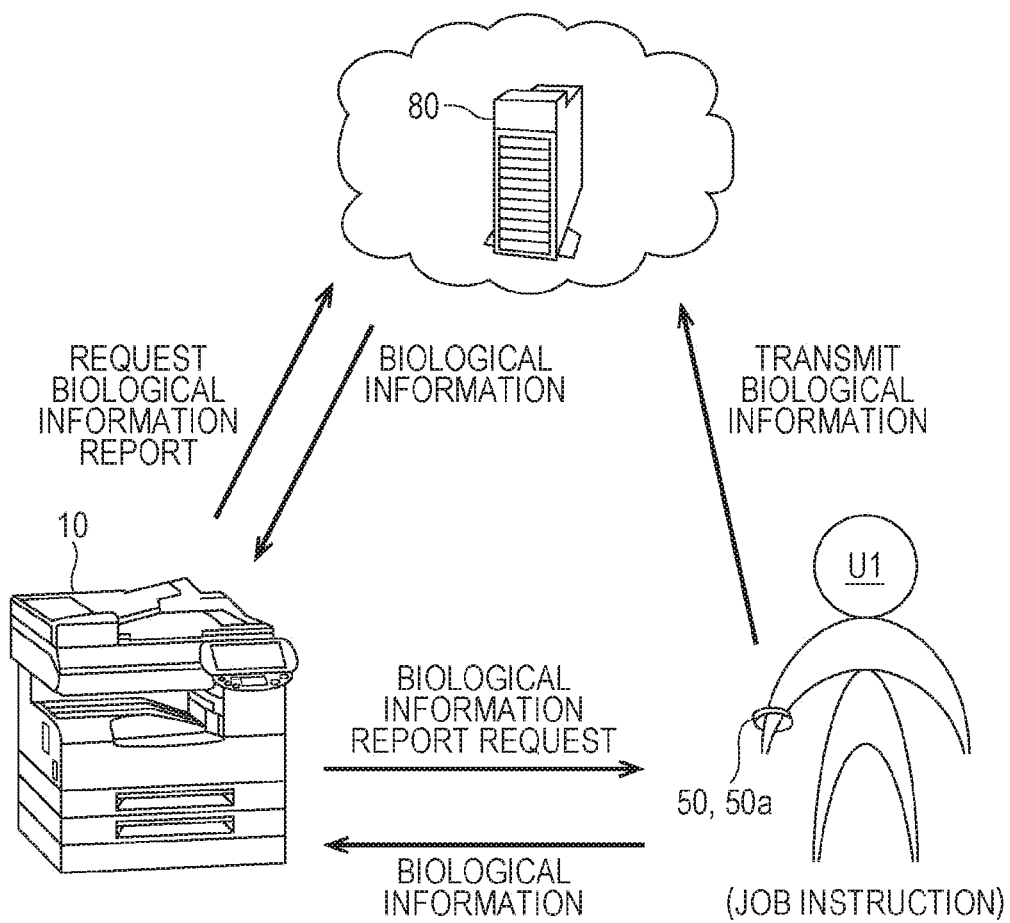
FIG. 16 is a diagram illustrating a state in which an MFP acquires biological information via a server.

FIG. 16 is a diagram illustrating such a modified example.

In this modified example, the wearable terminal 50 periodically transmits (transfers) biological information measured by the wearable terminal 50 to the server 80 (such as a cloud server) whether there is a transmission request from the MFP 10 or not. The server 80 sorts the received biological information for each user and stores the sorted information.

In the meantime, the MFP 10 performs a job basically by performing operation similar to that in FIG. 5 or the like. The MFP 10, however, transmits a request for transmitting the biological information of the user U1 (a biological information report request (step S21)) to the server 80 instead of the wearable terminal 50. The transmission request contains information on the user U1 (a user ID, a password, and the like), measurement period information of the biological information to be transmitted, and the like. The measurement period information contains information relating to a specified period specifying a time point of measurement (a period of measurement) of biological information to be transmitted (information specifying a time point of measurement (a start of the specified period) from which and a time point of measurement (an end of the specified period) until which biological information is to be transmitted, or the like). For example, the measurement period information contains information specifying a start and an end of a period during which each operation screen is operated.

Upon receiving the transmission request, the server 80 extracts the biological information of the user U1 measured within the specified period from biological information stored in the server 80, and transmits the extracted biological information to the MFP 10. The MFP 10 receives and acquires the biological information of the user U1 (more specifically, the biological information associated with the period during which each operation screen is operated) from the server 80. The MFP 10 then generates operation screen history information on the basis of the received biological information.

According to such a mode as well, the MFP 10 is capable of acquiring biological information of the user U1.

Although the present invention has been described and illustrated in detail, it is clearly understood that the same is by way of illustrated and example only and is not to be taken byway of limitation, the scope of the present invention being interpreted by terms of the appended claims.

What is claimed is:

1. An image processing apparatus comprising:
   at least one of an optical reader configured to optically read an original document and a printer configured to print an image on media;
   a display unit configured to display a plurality of different operation screens, each of the screens related to a different setting operation of the image processing apparatus; and
   a controller configured to:
   acquire biological information of a user performing operation using each of the operation screens, the biological information varying reflecting a state of the user;
   control operation of registering information on each of the operation screens and the biological information of the user in association with each other, and
   compare the biological information associated with one of the operation screens to the biological information associated with others of the operation screens to identify whether a difference between the biological information associated with the one of the operation screens and the biological information associated with the others of the operations screens is greater than a predetermined threshold.

2. The image processing apparatus according to claim 1, wherein
   the biological information is information that changes reflecting a mental condition and/or a physical condition of the user.

3. The image processing apparatus according to claim 1, wherein
   the biological information includes information relating to at least one of pulse wave, electrocardiogram, body temperature, heart rate, and blood pressure.

4. The image processing apparatus according to claim 1, wherein
   the information on each of the operation screens contains screen identification information of the each of the operation screens, and
   the controller is configured to register the screen identification information of the each of the operation screens and the biological information of the user in association with each other.

5. The image processing apparatus according to claim 1, wherein
   the information on each of the operation screens contains screen identification information of the each of the operation screens and operation information indicating a content of operation on the each of the operation screens, and
   the controller is configured to register the screen identification information of the each of the operation screens, the operation information of the each of the operating screens, and the biological information of the user in association with one another.

6. The image processing apparatus according to claim 5, wherein the controller is configured to:
   determine the one of the operation screens requires an improvement when the state of the user within a period during which the one of the operation screens is displayed is determined not to be in a normal condition on a basis of the biological information of the user, and determine an operation button operated on the improvement needed screen to be an improvement needed button; and
   output a guidance relating to the improvement needed button when the one of the operation screens determined to be the improvement needed screen is called again in response to a user operation and displayed as a new operation screen.

7. The image processing apparatus according to claim 5, wherein the controller is configured to:
   determine one of the operation screens requires an improvement when the state of the user within a period during which the one of the operation screens is displayed is determined not to be in a normal condition on a basis of the biological information of the user, and determine an operation button operated on the improvement needed screen to be an improvement needed button; and
   display a menu screen on a display, wherein
   after presence of the improvement needed button is determined, the controller is configured to add a call button for calling an operation screen relating to the improvement needed button or the improvement needed button itself onto the menu screen.

8. The image processing apparatus according to claim 1, wherein the controller is configured to:
   acquire biological information items each measured at a specific timing of each of the operation screens, and
   register each of the biological information items in association with information on a corresponding one of the operation screens.

9. The image processing apparatus according to claim 8, wherein the specific timing of each operation screen is a time point immediately after screen transition from the operation screen.

10. The image processing apparatus according to claim 1, wherein
the information on each of the operation screens contains screen identification information of the each of the operation screens and a plurality of operation information items each indicating a content of one of a plurality of operations on the each of the operation screens, and
the controller is configured to:
acquire a plurality of biological information items each measured at one of time points associated with the content of the operations of the each of the operation screens, and
register the screen identification information of the each of the operation screens, a corresponding one of the operation information items of the each of the operation screens, and a corresponding one of the biological information items in association with one another.

11. The image processing apparatus according to claim 1, wherein the controller is configured to:
acquire a plurality of biological information items measured at a plurality of time points within a period corresponding to a period during which each of the operation screens is displayed, and
register the biological information items in association with the information on the each of the operation screens.

12. The image processing apparatus according to claim 11, wherein
the biological information items are measured at the plurality of time points, the plurality of time points being at predetermined time intervals.

13. The image processing apparatus according to claim 1, wherein the controller is configured to:
acquire at least one of biological information items measured within a period corresponding to a period during which each of the operation screens is displayed, and
register only biological information items resulting from changes by a predetermined level or larger from a most recently registered biological information item, among the at least one of biological information items, in association with the information on the each of the operation screens.

14. The image processing apparatus according to claim 1, wherein
the controller is configured to acquire the biological information measured by a wearable device worn by the user from the wearable device through communication with the wearable device.

15. The image processing apparatus according to claim 1, wherein
the controller is configured to acquire the biological information measured by a wearable device worn by the user, thereafter transferred to a server and stored in the server, from the server through communication with the server.

16. The image processing apparatus according to claim 1, wherein
the controller is configured to transmit operation screen history information containing the information on the each of the operation screens and the biological information of the user in association with each other to a server for storage of the operation screen history information.

17. The image processing apparatus according to claim 1, wherein the controller is configured to:
determine one of the operation screens requires an improvement when the state of the user within a period during which the one of the operation screens is displayed is determined not to be in a normal condition on a basis of the biological information of the user.

18. The image processing apparatus according to claim 1, wherein the biological information includes information relating to blood pressure.

19. The image processing apparatus according to claim 1, wherein the biological information indicates a user's state of anxiety.

20. A non-transitory recording medium storing a computer readable program causing a computer included in an image processing apparatus to execute:
a step of acquiring biological information of a user performing operation using a plurality of operation screens of the image processing apparatus, the biological information varying reflecting a state of the user;
a step of performing operation of registering information on the operation screens and the biological information of the user in association with each other, and
a step of comparing the biological information associated with one of the operation screens to the biological information associated with others of the operation screens to identify whether a difference between the biological information associated with the one of the operation screens and the biological information associated with the others of the operations screens is greater than a predetermined threshold.

21. An image processing system comprising:
an image processing apparatus including at least one of an optical reader configured to optically read an original document and a printer configured to print an image on media; and
a server, wherein
the image processing apparatus includes:
a display unit configured to display a plurality of operation screens, each of the screens related to a different setting operation of the image processing apparatus; and
a controller configured to:
acquire biological information of a user performing operation using each of the operation screens, the biological information varying reflecting a state of the user;
control operation of transmitting information on each of the operation screens and the biological information of the user in association with each other to the server,
compare the biological information associated with one of the operation screens to the biological information associated with others of the operation screens to identify whether a difference between the biological information associated with the one of the operation screens and the biological information associated with the others of the operations screens is greater than a predetermined threshold, and
the server includes
a storage configured to store operation screen history information from the image processing apparatus.

* * * * *